N. HODGE.
CAR WHEEL.
No. 8,526.  Patented Nov. 18, 1851.
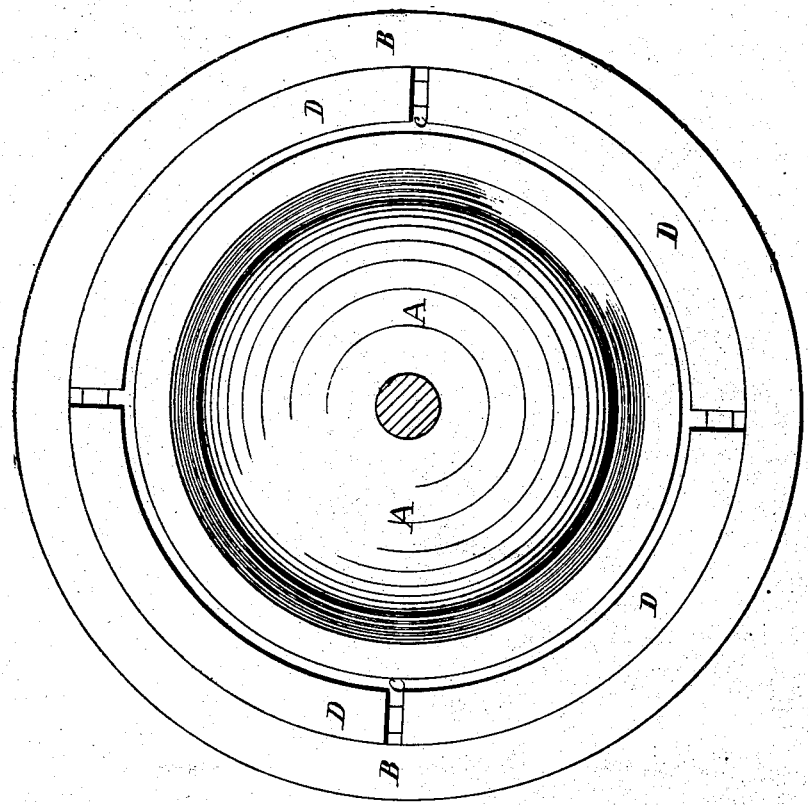
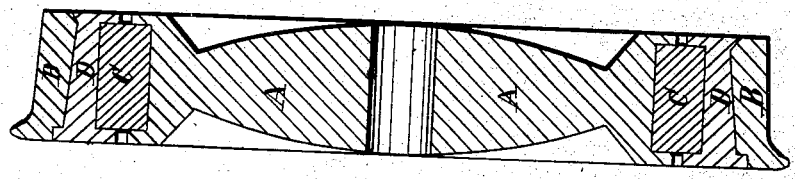

UNITED STATES PATENT OFFICE.

NEHEMIAH HODGE, OF ADAMS, MASSACHUSETTS.

RAILROAD-CAR WHEEL.

Specification of Letters Patent No. 8,526, dated November 18, 1851.

*To all whom it may concern:*

Be it known that I, NEHEMIAH HODGE, of Adams, in the county of Berkshire, and State of Massachusetts, have invented a new and useful Improvement in Railroad-Car Wheels, of which the following is a full, clear, and exact description, reference being had to the accompanying drawing, which forms part of this specification, and in which—

Figure 1 is a side elevation of a railroad car wheel with my improvements applied thereto and Fig. 2 is a section of the same in a plane passing through the axis.

My invention consists in making a car wheel in not less than two concentric parts and connecting these parts by vulcanized india rubber, or other analagous elastic material interposed between them; whereby the annular, or outer part of the wheel, is insulated from the central or inner part by a substance that will not transmit vibrations from the rim to the center or axle of the wheel, whether such vibrations be lateral or radial in direction.

My invention consists further in a method of connecting the several parts of a sectional wheel by interposing between the parts to be connected an elastic substance in a compressed state, which by its tendency to expand in all directions holds the parts of the wheel in place without the use of screws, bolts, keys, rivets, or other fastenings liable to work loose.

The wheel represented in the accompanying drawings to exemplify my invention consists of a body A and of a rim B of metal which are connected by an annular cushion of vulcanized india rubber C surrounded by a series of annular segments D of metal.

The body A is made with a central hub in the usual manner to connect it with the axle, and* at its periphery has a groove formed in it to receive the inner side of the ring of india rubber C which enters it in the manner of a tongue; the ring of india rubber is made in segments for the sake of convenience. The india rubber is surrounded by a metal ring D made in segments whose inner periphery has the form of a hollow cylinder with an annular groove sunk in it that corresponds with the groove on the periphery of the body and receives the outer side of the india rubber ring; the outer periphery of these segments is in the form of the frustum of a cone with an annular groove running around it, the side of which at the base of the frustum is at right angles to its axis, and the side next the top of the frustum inclines outward from the axis at an angle of about 45°; the exterior periphery of the ring of segments D thus formed, fits the inner periphery of the rim B which in shape is their exact counterpart, a piece is cut off the end of each of the segments to allow them to be compressed upon the india rubber in the operation of putting the wheel together; the thickness of the outer or narrow edge of the segments, should not exceed the thickness of the annular space between the body and rim near the outside of the wheel, through which it has to pass for a purpose to be hereafter described. The rim is a ring whose inner periphery as above described is the counterpart of the outer peripheries of the segments and its outer periphery or tread made in the usual form of the frustum of a cone with a flange round its base.

The several parts of the wheel being shaped as described, they are next to be put together, which is done by placing the ring of india rubber in the groove on the periphery of the body A, the segments D are then applied to the outside of the india rubber which enters the grooves on their inner periphery, the rim is now laid upon a firm bench, with its widest end upward, and the body surrounded by the ring of india rubber and the conical segments, are forced down the smallest end foremost into the rim by means of a hydraulic, or other powerful press, in a manner similar to that in which car wheels are commonly forced onto their axles; as the small end of the segmental ring enters the wide-end of the rim, the segments come in contact with the inner surface thereof, which gradually converges toward the outside of the wheel, and as the segments move downward compresses them upon the india rubber and condenses the latter until the outer diameter of the small end of the segment is contracted sufficiently to pass the narrowest part of the interior of the rim, when the elasticity of the india rubber will again force the segments to expand until the inclined or beveled side of the groove is brought to coincide with the chamfered inner corner of the outer edge of the rim and the square side of the groove fits into the rabbeted inner corner of the inside of the rim; the pressure may now be removed and the several parts of the wheel will be found to be connected together in their proper relative positions, with greater or less firmness, as the radial dimensions of the india rubber ring, before the wheel was put together, exceeded more or less the radial dimensions of the groove or space which it now occupies between the segments and the body of the wheel, and the force required for pressing the parts of the wheel together, will be in like manner greater or less.

If it should be required to take the wheel apart it is merely necessary to turn it over and apply the pressure against the opposite side of the body and segments; the power required to force out the segments and body from within the rim, will be greater than that required to enter them, as the angle formed with the axle by the surface of the chamfer on the inner corner of the outside of the rim is greater than the angle formed with the axle by the inner surface of the rim, within the chamfer.

The ring of india rubber in a wheel thus constructed acts as an annular key or tongue to keep the body and rim in the same plane by entering their adjacent grooves and holding itself there by its own elasticity, so that the inner and outer parts of the wheel cannot separate in running without either being broken or else shearing the ring of india rubber into two annular pieces, the latter being next to impossible and the former being much less likely to happen in this than in the common wheel. The proportion which the radial width of the india rubber before insertion in the groove must exceed the radial width of the space in the wheel for its reception, in order that the rubber may be subjected to the proper amount of compression to cause it to act with the requisite amount of elastic force, will depend upon the texture of the rubber itself, as for example whether it be more, or less dense, or hard, and also upon the thickness and width of the elastic ring itself, and whether also, the track it is designed to run upon, be rough, or smooth; and taking these modifying circumstances into consideration, each constructor will have to exercise his own judgment as to the proportions most suitable in each particular case.

It will now be seen that in the wheel thus constructed, the rim is insulated from the body by the ring of india rubber, which being elastic yields to pressure in any direction and acts as a spring cushion to intercept the jars produced by irregularities in the track or in the tread of the wheel; it is evident that this office of the spring cushion is exerted in a lateral as well as in a radial direction, for the body and rim are retained in their relative positions solely by the ring of rubber which is elastic in every direction, the wheel therefore is essentially elastic and relieves the car from the jars resulting from the striking of the wheel flange against the side of the rail, as well as from those due to the passage of the tread of the wheel over sudden elevations and depressions on the top of the rails.

The method I have described of constructing this elastic wheel is that which I prefer, but it will be evident to the skillful engineer, that the wheel I have described may be modified in form and construction without affecting the principle of universal elasticity which this invention embodies; thus, for example, the rubber may be inserted in the form of a disconnected series of blocks, instead of in the form of a continuous band; or the rim and body of the wheel may be made in any known or approved way, and if it be found that the elastic band allows too much lateral play, ears, or brackets, may be secured to the body of the wheel to limit the distance to which it or the rim can yield laterally.

If it is found advisable to increase the elasticity of the wheel in a lateral direction, this can be done either by increasing the radial width of the band of india rubber, and the space between the body and rim of the wheel, or by inserting in the wheel several concentric cushions of rubber.

The foregoing modifications are merely suggested for the purpose of indicating the great variety and extent of changes that may be made in the structure of the wheel, without any departure from the principle which I have invented, and which is susceptible of almost unlimited variation while still preserving its essential characteristic. which is, the insulation of the tread or rim of the wheel from the axle, hub, or main body of the same, by an intervening cushion of some elastic substance that will yield in every direction so as to impart to the wheel both radial and lateral elasticity.

What I claim as my invention and desire to secure by Letters Patent is—

1. Connecting the tread or rim of a car wheel to the hub or central part thereof by means of india rubber or other analagous elastic material, such elastic material being connected with the outer periphery of the central part of the wheel by a groove on the latter, or its equivalent, and to the inner periphery of the rim, also by a groove thereon, or its equivalent; the india rubber holding itself in both grooves by its elasticity and giving to the wheel lateral as well as radial elasticity, as herein described.

2. I also claim the grooved segments constructed substantially as herein described and interposed between the india rubber and the rim, for the purpose of facilitating the insertion of the india rubber into the space between the rim and central part of the wheel and its removal therefrom as herein set forth.

In testimony whereof I have hereunto subscribed my name.

NEHEMIAH HODGE.

Witnesses:
P. H. WATSON,
I. S. SMITH.